US012600022B2

(12) United States Patent
Bek et al.

(10) Patent No.: US 12,600,022 B2
(45) Date of Patent: Apr. 14, 2026

(54) POWER TOOL

(71) Applicant: C. & E. Fein GmbH, Schwaebisch Gmuend-Bargau (DE)

(72) Inventors: Fabian Bek, Boebingen (DE); Wolfgang Duernegger, Schorndorf (DE); Robert Wittlich, Durlangen (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 0 days.

(21) Appl. No.: 18/593,197

(22) Filed: Mar. 1, 2024

(65) Prior Publication Data

US 2024/0293923 A1 Sep. 5, 2024

(30) Foreign Application Priority Data

Mar. 1, 2023 (EP) .................................... 23159426

(51) Int. Cl.
*B25F 5/00* (2006.01)
*B24B 23/02* (2006.01)

(52) U.S. Cl.
CPC ............ *B25F 5/001* (2013.01); *B24B 23/028* (2013.01)

(58) Field of Classification Search
CPC .................................................... B24B 45/006
See application file for complete search history.

(56) References Cited

U.S. PATENT DOCUMENTS 4,989,374 A 2/1991 Rudolf et al.
7,344,435 B2 * 3/2008 Pollak .................. B24B 45/006 83/698.41
11,890,720 B2 2/2024 Luescher et al.
2013/0082449 A1 * 4/2013 Bernardi ............... B24B 23/022 279/141
2021/0276146 A1 * 9/2021 Zurbruegg ............ B24B 45/006

FOREIGN PATENT DOCUMENTS

EP 0319813 A2 6/1989
WO WO2018072995 A1 4/2018

* cited by examiner

*Primary Examiner* — Daniel Jeremy Leeds
(74) *Attorney, Agent, or Firm* — Muncy, Geissler, Olds & Lowe, P.C.

(57) ABSTRACT

A power tool, wherein a lubricant for gearbox lubrication can be accommodated in a gearbox housing interior of the gearbox housing, wherein the output shaft has a first end on which an insert tool unit can be mounted, and has a second end, wherein the output shaft is designed as a hollow spindle with a cavity. A hollow cylinder section is formed at its second end. An actuator is arranged in a rotationally resistant manner to the gearbox housing, which engages with the hollow cylinder section. Between the hollow cylinder section and the actuator, a gap extends along the axis of rotation which at its first end is connected to the cavity and at its second end to the gearbox housing interior. A shaft seal is disposed in the gap, which counteracts the leakage of lubricant from the gap towards the first end of the output shaft.

14 Claims, 3 Drawing Sheets

POWER TOOL

This nonprovisional application claims priority to European Application No. 23159426.8 which was filed on Mar. 1, 2023, in Europe and is herein incorporated by reference.

BACKGROUND OF THE INVENTION

Field of the Invention

The invention relates to a power tool, in particular an angle grinder, with a drive motor mounted in a housing to drive a drive shaft, with a gearbox housing to accommodate a gear unit, in particular an angular gearbox, for the conversion of the rotation of the drive shaft into a rotation of an output shaft about an axis of rotation of the gearbox unit, wherein a lubricant for the lubrication of the gearbox can be accommodated in a gearbox housing interior of the gearbox housing, wherein the output shaft has a first end at which an insert tool unit can be mounted, and a second end, wherein the output shaft is designed as a hollow spindle with a hollow cylinder section at its second end, and wherein an actuator which engages in the hollow cylinder section and which is used in particular for the tool-free fixation of the insert tool unit to the output shaft is arranged in a rotation-proof manner to the gearbox housing.

Description of the Background Art

A power tool is known from WO2018072995A1, which corresponds to US 2020/0039026, which is incorporated herein by reference.

During the operation of such power tools, it was observed that due to the rotation of the hollow spindle, the lubricant escapes from the interior of the gearbox housing and enters the cavity between the actuator and the hollow cylinder section of the hollow spindle and exits from there into the environment. As a result, the work area becomes dirty and after prolonged use, the gearbox runs dry, which usually leads to a failure of the power tool.

SUMMARY OF THE INVENTION

It is therefore an object of the present invention to counteract or, if possible, prevent the leakage of lubricant from the interior of the gearbox housing.

There is a gap between the hollow cylinder section and the actuator, extending along the axis of rotation (R), which is connected at its first end to the cavity of the hollow spindle and at its second end to the interior of the gearbox housing. This means that there is a connection between the cavity of the hollow spindle and the inside of the gearbox in the form of a passage or a gap. The lubricant entering the gap exerts a lubricating effect between the actuator and the hollow spindle and, in addition, a shaft seal located in the gap counteracts the escape of lubricant from the gap towards the first end. Due to the gap sealed by means of a shaft seal, the ingress of lubricant into the area between the actuator and the hollow spindle is possible, wherein the shaft seal reduces or prevents the loss of lubricant to the environment. In this way, the gearbox remains operational and the reliability of the power tool is increased.

The shaft seal can be designed in accordance with one of the following types of shaft seals:

Threaded shaft seal: This type of seal uses a thread on the output shaft to create a seal by means of a return capability.

Radial shaft seal: This seal is suitable for sealing the cavity of the rotating output shaft in the radial direction. In particular, it includes a sealing lip that sits either directly on the shaft or on an elastic elastomer.

Axial shaft seal: This seal can be used to prevent lubricating grease from escaping from the gap between the rotating hollow spindle and the actuator in the axial direction.

Labyrinth seal: This type of seal is formed of a series of interlocking rings and/or stages and can be used to minimize lubricating grease loss through the gap between the rotating output shaft and the actuator.

Magnetic shaft seal: This type of seal uses magnetic force to achieve a tight seal.

The shaft seal can be a threaded shaft seal. The threaded shaft seal can be used in particular for the return of the lubricant from the gap towards the gearbox housing. The principle is as follows: A lubricant-filled hollow cylinder section of the hollow spindle, which rotates about the actuator, carries the lubricant along in the circumferential direction. If there are additional sloping channels (grooves) in the inner wall of the hollow cylinder section or in the outer wall of the actuator, or in a bushing inserted into the gap, then the lubricant carried along by the output shaft is deflected on the side walls of these channels. This creates an axial flow component in the channels, in other words: the rotating output shaft transports fluid, especially liquid, axially through the gap.

A groove in a cylinder that runs diagonally to the circumferential direction forms a thread. Whether the thread is located in the rotating output shaft, in a bushing inserted there or in the stationary actuator does not change the principle of lubricant delivery. The "threaded shaft" becomes a seal in that the return flow, which is generated by the rotation of the output shaft in relation to the actuator, is opposed to a pressure-induced leakage flow through the gap. The conveying effect is influenced by the direction of rotation and the thread pitch $\alpha$. Preferably, $2° \le \alpha \le 45°$, preferably $3° \le \alpha \le 35°$, preferably $3° \le \alpha \le 20°$, preferably $4° \le \alpha \le 15°$, preferably $4° \le \alpha \le 10°$.

Preferably, the actuator engages up to an engagement length in the hollow cylinder section. Preferably, the axial length of the threaded section of the hollow cylinder section, actuator or bushing is less than the engagement length. Preferably, the axial length of the threaded section of the hollow cylinder section, actuator or bushing is the same, or substantially the same as the engagement length. Preferably, the length of the bushing is less than, or preferably equal to, the engagement length. The axial length of the threaded section can be used to shape the conveying effect.

Preferably, the thread of the threaded shaft seal is a flat thread. This results in a particularly efficient conveying. Preferably, the thread, especially flat thread, has a rectangular passage cross-section. This results in a particularly good sealing capacity in the event of laminar flow. The flat thread has a flat profile: the height H of the thread in the axial direction is greater by a factor of c than the depth t of the thread in the radial direction ($H=c*t$). The factor c can be at least 2, 4, 6, 8 or 10 ($H>c*t$). The flank angle $\beta$ of the thread is preferably 0°, which means that the thread flanks are parallel to each other, but it can also be between 0 and 20°.

The remaining gap depth h between the thread and the actuator or between the thread and the hollow cylinder section is preferably as small as possible and can be in the range of $h=10 \ldots 60$ μm in the radial direction, taking into account thermal expansion.

Preferably, the thread, especially the flat thread, of the threaded shaft seal is only one thread. However, it is also particularly preferable for the thread, especially the flat thread, to be formed of multiple threads. The thread pitch angle is also preferably in the range of $\alpha=10° \ldots 15° \ldots 20°$. The thread depth t in the radial direction is preferably at least as large as, or about two or three times as large as, the gap width h, so that $t/h=2 \ldots 2.5 \ldots 3$. Preferably, the thread has a depth equal to or less than t=0.1 mm. The gears and the dams of the thread should preferably be of the same width.

Preferably, a bushing is arranged in the hollow cylinder section, which is secured against rotation about the axial direction, in particular in relation to the hollow cylinder section, or which is fixed in relation to the hollow cylinder section. Preferably, the bushing is pressed into the hollow cylinder section. Preferably, an internal thread is formed on the cylindrical inner wall of the bushing—but the thread can also be provided on the actuator if a bushing is present; in this case, the bushing preferably has a smooth inner wall. The bushing allows for the width of the gap to be restricted and defined in the radial direction in order to in this way already determine the opening cross-section for the passage of the lubricant. Depending on the axial length of the bushing, the sealing effect can be further adjusted.

The bushing can be made of metal, especially bronze. However, it can also contain or be made of ceramic, plastic or a composite material.

Preferably, the bushing can have an outer flange that can rest against the second end of the output shaft in the area of the hollow cylinder section. This makes it easier to position and secure the bushing in the hollow spindle.

Preferably, the bushing can have a wall thickness between 0.2 mm and 0.8 mm, preferably between 0.3 mm and 0.5 mm.

Preferably, an internal thread can be formed on a cylindrical inner wall of the hollow cylinder section, which forms the threaded shaft seal. In this case, the opposite wall of the actuator is preferably smooth.

Preferably, an external thread can be formed on a cylindrical outer wall of the actuator, which forms the threaded shaft seal. In this case, the surface of the opposite wall of the hollow cylinder section is preferably free of grooves or depressions, thus smooth.

Preferably, the actuator engages up to an engagement length in the hollow cylinder section. Preferably, the axial length of the threaded section of the hollow cylinder section, the actuator or the bushing is less than the engagement length. Preferably, the axial length of the threaded section of the hollow cylinder section, actuator or bushing is the same, or substantially the same as the engagement length. Preferably, the length of the bushing is less, or preferably equal to, the engagement length.

Preferably, the hollow spindle has the first hollow cylinder section, which has a first diameter, in which the actuator in particular engages, and concentric to this at least one second hollow cylinder section, which has a second diameter. The value of the second diameter differs in particular from the value of the first diameter and is in particular larger than the first diameter, in particular at least twice as large. This allows for the locking mechanism of the quick release device to be accommodated in the hollow spindle. The actuator, which can preferably be moved in translation relative to the gearbox housing, in particular, is an actuator that can be deflected against a spring force by a manually operated lever element. In particular, an eccentric is arranged on the lever element.

The actuator can extend in the axial direction at a passage through the gearbox housing, in particular also through an external housing of the power tool. A seal, in particular an O-ring element, is provided to seal the passage in order to prevent lubricant from escaping, in particular there. In particular, a cover element is provided between one of the front sides of the hollow cylinder section, which supports the hollow cylinder section in relation to the gearbox housing in the axial direction. The cover element preferably presses the seal against the gearbox housing or a wall section surrounding the passage.

The hollow spindle can be mounted on the gearbox housing by means of a first bearing, and preferably mounted on a bearing plate element or a mounting flange of the bearing plate element by means of a second bearing. The output shaft extends in particular through the bearing plate element and the mounting flange. The first bearing is preferably a needle bearing, which allows for a low component volume. The second bearing element is preferably a ball bearing, a sealed ball bearing. The interior of the gearbox housing is sealed in particular by the second bearing and partially sealed by the first bearing.

Preferably, the power tool can have a quick release device that is set up for tool-free fixation of the insert tool unit to the output shaft. Preferably, the actuator is an actuating element of the quick release device.

Preferably, the quick release device can have at least one clamping unit which, for tool-free fixing of the insert toll unit to the output shaft, has at least one movably mounted clamping element for exerting a clamping force on the insert tool unit in a clamping position of the clamping element, and has at least one operating unit for carrying out a movement of the clamping element into the clamping position and/or into a release position of the clamping element, in which the insert tool unit can be removed from the clamping unit.

Preferably, the quick release device can have at least one decoupling unit provided to decouple the operating unit from the clamping unit as a function of the speed of the output shaft.

Preferably, the power tool can be designed as an angle grinder, in particular as an EC power angle grinder.

Advantageously, a hook device of a tool holder of the quick release device has a snap-in mechanism by means of which an accessory in the form of an insert tool can be clicked into place. The term "insert tool" can include all tools that make it possible to process or remove a wide variety of materials, e.g. grinding or cutting wheels, brushes, diamond cutting tools, flexible sanding discs, serrated washers, diamond hole cutters, etc.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
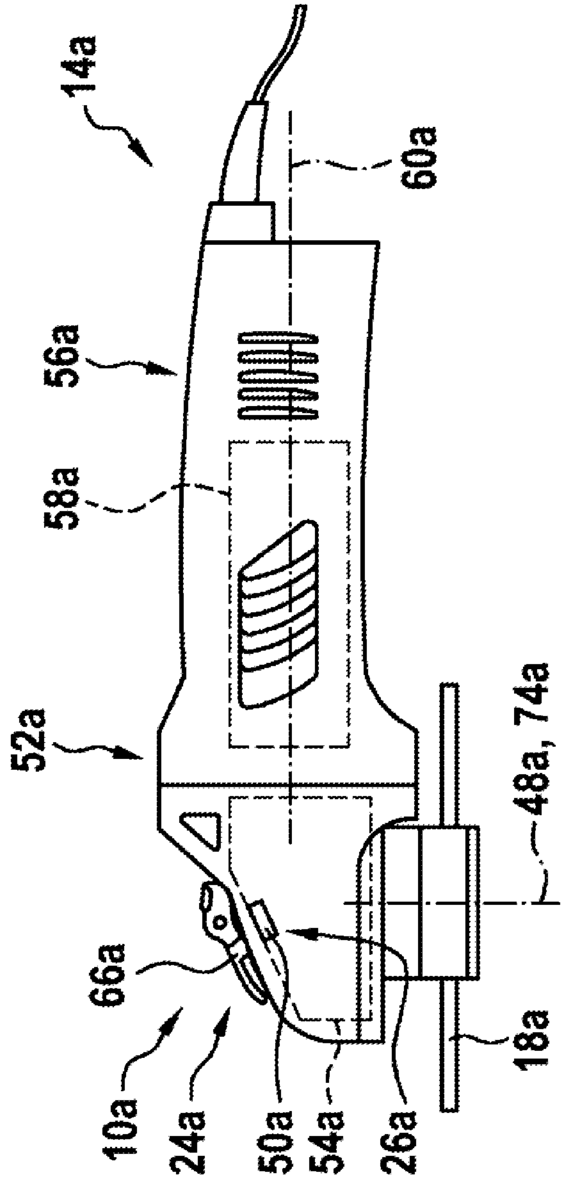
FIG. 1 is a side view of an inventive tool designed as an angle grinder according to an example.

FIG. 1 shows a power tool designed as a portable machine tool 14*a*, with a quick release device 10*a*, analogous to the machine tool shown in WO2018072995A1. The machine tool is shown as an angle grinding machine. However, there is also the possibility that the portable machine tool 14*a* has a different design, such as, e.g., a circular sawing machine or grinding machine. The gearbox housing 52*a* of the portable machine tool 14*a* is used to accommodate and/or support a gear unit 54*a* and is preferably made of a metallic material. However, it is also conceivable that the gearbox housing 52*a* is made of another suitable material, such as plastic. The gearbox unit 54*a* is designed as a right-angle gear and contains a rotationally driven output shaft 12*a*, to which an insert tool unit 18*a* can be fixed by means of the quick release device 10*a*. The portable machine tool 14*a* contains a hollow spindle as output shaft 12*a*, in which the quick release device 10*a* is located, at least in part (see FIG. 2). A protective cover unit 90 can be attached to the gearbox housing 52*a* or the mounting flange 92 of a bearing plate in a known manner, while an additional handle can also be attached to the gearbox housing 52*a* in a known manner. The drive unit 58*a* of the portable machine tool 14*a* is received and/or stored in the motor housing 56*a*. Preferably, the drive unit or the drive motor 58*a* drives the output shaft 12*a* in a rotating manner about the rotation axis 48*a* by means of interaction with the gear unit 54*a*. The axis of rotation 48*a* of the output shaft 12*a* is at least essentially perpendicular to a drive rotation axis 60*a* of the drive unit 58*a*. The drive unit 58*a* is preferably designed as an electric motor but can also have a different design that seems sensible to a skilled person, such as an internal combustion drive unit, hybrid drive unit, pneumatic drive unit or similar.

Figure 2:
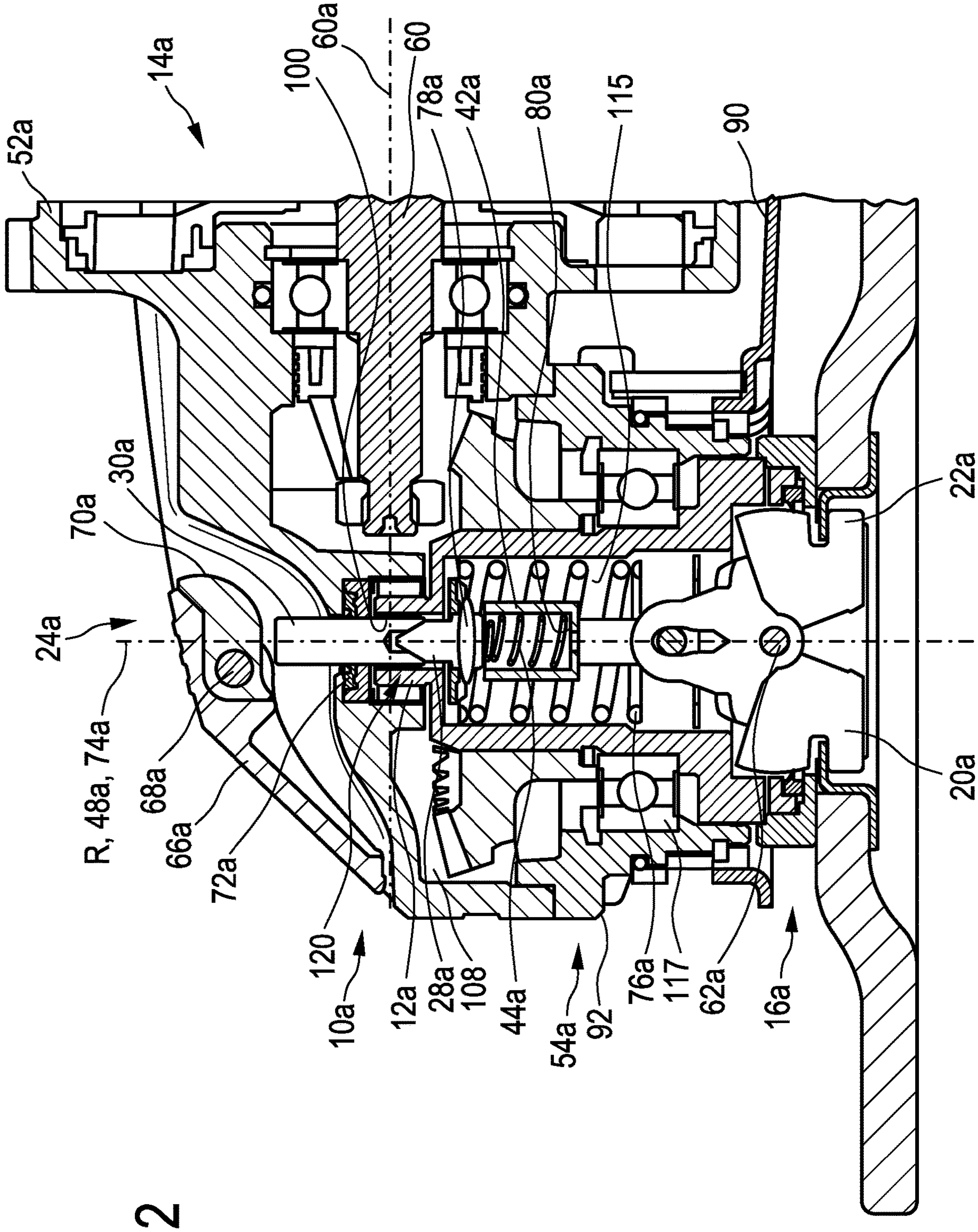
FIG. 2 is a lateral cross-sectional view of a section of an inventive tool designed as an angle grinder according to an example.

FIG. 2 shows a representation of the gearbox housing 52*a* and the quick release device 10*a* of a portable machine tool 14*a*. This quick release device is used for the secure attachment of the insert tool unit 18*a* to the rotationally driven output shaft 12*a*. It is formed of at least one clamping unit 16*a*, which contains a movably mounted clamping element 20*a*, 22*a*, which exerts a clamping force on the insert tool. The quick release device 10*a* also contains an operating unit 24*a*, which makes it possible to move the clamping element 20*a*, 22*a* into the clamping position and/or a release position, whereby the insert tool 18*a* can be removed from the clamping unit 16*a* and/or the output shaft 12*a*.

The clamping unit 16*a* contains at least two movably mounted clamping elements 20*a* and 22*a*, but it is also possible that it contains a different number of clamping elements. Both clamping elements 20*a* and 22*a* have a similar structure, which is why features that are described in one of the clamping elements also apply to the other. The clamping elements 20*a* and 22*a* are swivel mounted and have a swivel axis 62*a* which is essentially perpendicular to the rotation axis 48*a* of the output shaft 12*a*. They are used to fix the insert tool unit 18*a* in an axial position to the output shaft 12*a*, especially in the clamping position. The clamping elements 20*a* and 22*a* are torsionally connected to the output shaft 12*a* and rotate together with it about the rotation axis 48*a*.

The clamping unit 16*a* has at least one rotary drive element to enable torque to be transmitted to the insert tool unit 18*a*. When the insert tool unit 18*a* and clamping unit 16*a* or output shaft 12*a* are in a certain arrangement state, this rotary drive element engages in a mounting recess on the insert tool unit 18*a* and transmits the torque to a limiting edge of the insert tool unit 18*a*. The transmission of torque between output shaft 12*a* and insert tool unit 18*a* is carried out in the known manner by means of a positive connection between the rotary drive element and the insert tool unit 18*a*. The rotary drive element is torsionally attached to the output shaft 12*a* and can rotate together with the latter about the axis of rotation 48*a*.

The operating unit 24*a* is mainly intended to move the clamping elements 20*a* and 22*a*, in particular the two clamping elements 20*a* and 22*a*, at least into the position in which the insert tool 18*a* can be removed from the clamping unit 16*a* or the output shaft 12*a*. Alternatively or additionally, it is possible for the operating unit 24*a* to be used to move the clamping elements 20*a* and 22*a*, in particular the two clamping elements 20*a* and 22*a*, at least into the clamping position in which the insert tool 18*a* can be fixed to the output shaft 12*a* by the clamping unit 16*a*. The operating unit 24*a* preferably includes at least one operating element 66*a*, which can be operated by a user. The operating element 66*a* is designed as an operating lever and has a movement axis 68*a*, in particular a swivel axis, which runs transversely, in particular at least substantially perpendicular, to the axis of rotation 48*a* of the output shaft 12*a*. The operating element 66*a* is preferably mounted so as to swivel about the movement axis 68*a*, in particular the swivel axis, and is separated from a rotary movement of the output shaft 12*a*.

The operating element 66*a* includes an eccentric section 70*a* to actuate an actuating element 30*a* of the operating unit 24*a*. The actuating element 30*a* is movably mounted along the axis of rotation 48*a*, for example of the output shaft 12*a*, or in the gearbox housing 52*a*. It is secured against twisting in the gearbox housing 52*a*, for example by at least a lateral flattening that allows for axial movement and prevents rotational movement. Ideally, the actuating element 30*a* has at least one flattening on each of two opposite sides. It is also possible that the actuating element 30*a* has an alternative design that would make sense to an expert, such as a polygonal cross-section or a toothing to secure the actuating element 30*a* against twisting in relation to the gearbox housing 52*a*. In the area of the actuating element 30*a*, it is preferable to attach a sealing element 72*a*, e.g., a rubber gasket, in order to prevent dirt from entering the gearbox housing 52*a* and/or the clamping unit 16*a*. The sealing element 72*a* is fixed in place and rests against the actuating element 30*a*. When the actuating element 30*a* is moved, the actuating element 30*a* slides on at least one sealing surface of the sealing element 72*a*.

The quick release device 10*a* contains at least one decoupling unit 26*a*, which is used to separate the operating unit 24*a* from the clamping unit 16*a* as a function of the speed of the output shaft 12*a*. The decoupling unit 26*a* is designed in such a way that when the speed of the output shaft 12*a* changes, there is movement between at least one part of the decoupling unit 26*a* and the actuating element 30*a* of the operating unit 24*a*, thereby separating the operating unit 24*a* from the clamping unit 16*a*. The decoupling unit 26*a* contains at least the movable decoupling element 28*a*, which can be moved to a decoupling position in which the operating unit 24a is separated from the clamping unit 16a when the speed of the output shaft 12a changes. Preferably, the decoupling unit 26a is designed as friction decoupling.

The decoupling unit 26a includes at least the movably mounted decoupling element 28a, which can be moved relative to the output shaft 12a as a result of a frictional force between the decoupling element 28a and the actuating element 30a of the operating unit 24a. The decoupling unit 26a has at least the movably mounted decoupling element 28a, which is movably mounted along and/or about the axis of rotation 48a of the output shaft 12a in the output shaft 12a. The decoupling unit 26a comprises at least the movably mounted decoupling element 28a and at least one decoupling spring element 44a, which applies a spring force to the decoupling element 28a towards the operating unit 24a. The decoupling unit 26a has at least the movably mounted decoupling element 28a and at least one sliding guide element for guiding the decoupling element 28a in the event of a relative movement of the decoupling element 28a relative to the output shaft 12a.

The decoupling element 28a may be brought into contact with the actuating element 30a by means of a frictional connection, or it may already be in contact via such a connection. The decoupling element 28a is preferably mounted in such a way that it can be moved along the axis of rotation 48a, in particular within the output shaft 12a or a transmission element 42a of the clamping unit 16a. It has a conical connection area, which at least partially engages with a recess of the actuating element 30a. The frictional effect between the actuating element 30a and the decoupling element 28a depends on the design of the conical connection area as well as the spring force of the decoupling spring element 44a. The decoupling spring element 44a is used to apply a spring force to the decoupling element 28a towards the actuating element 30a and is arranged in the transmission element 42a, which is designed as a clamping fork. The transmission element 42a is torsionally connected to the output shaft 12a, movably mounted within it and can be moved translationally along the clamping axis 74a. It can be subjected to a spring force via the tension spring element 76a of the clamping unit 16a, along the clamping axis 74a, in particular towards the operating unit 24a.

The decoupling unit 26a has at least one fastener 78a, which serves to connect the decoupling element 28a and the transmission element 42a in terms of movement, especially when the output shaft 12a is rotating slowly or is stationary. The fastener 78a is designed as a bolt and is attached to the decoupling element 28a. It can be moved together with the decoupling element 28a and extends into the sliding guide element of the decoupling unit 26a. This sliding guide element serves as a sliding block guide and is part of the transmission element 42a. When the output shaft 12a rotates, the decoupling element 28a and the fastener 78a can rotate relative to the transmission element 42a due to a braking effect caused by the actuating element 30a. The fastener 78a can be moved in a sliding block guide designed as a sliding block guide, so that the decoupling element 28a can be moved against the spring force of the decoupling spring element 44a into a guide recess 80a of the transmission element 42a. By actuating the operating element 66a during a rotational movement of the output shaft 12a, there is a movement of the actuating element 30a and the decoupling element 28a relative to the transmission element 42a. During a rotational movement of the output shaft 12a, it is largely impossible for an operator force to move the transmission element 42a via the operating unit 24a and for the clamping element 20a, 22a to be moved from the clamping position to the release position. When the output shaft 12a rotates slowly or is stationary, the axial force exerted by the actuating element 30a on the decoupling element 28a can be transmitted to the transmission element 42a by the interaction of the fastener 78a and the sliding guide element designed as a sliding block guide. The transmission element 42a can be moved by the operating unit 24a against the spring force of the clamping spring element 76a. It is used to move the clamping elements 20a and 22a from their clamping position into the release position.

According to the invention, and deviating from the machine tool described in WO2018072995A1, the power tool 14 shown here is a hand-held power tool, with a drive motor 58a mounted in a housing 52a, 56a for driving a drive shaft 60, with a gearbox housing 52a to accommodate a gearbox unit 54a, in particular an angular gearbox, for converting the rotation of drive shaft 60 into a rotation of an output shaft 12a about a rotation axis R of the gearbox unit, wherein a lubricant for gear lubrication can be accommodated in a gearbox housing interior of the gearbox housing, wherein the output shaft 12a has a first end on which an insert tool unit 18a can be mounted, and has a second end, wherein the output shaft 12a is designed as a hollow spindle with a cavity, which has a hollow cylinder section 105 at its second end, and wherein rotationally resistant to the gearbox housing 52a, an actuator 30a or ram 30a is arranged, in this case a cylindrical element within the hollow spindle which engages with the hollow cylinder section 105, wherein there is a gap 110 between the hollow cylinder section 105 and the actuator 30a, extending along the axis of rotation R, which gap is connected with the cavity 115 at its first end 111 and to the interior of the gearbox 108 at its second end 112, and that a shaft seal 100 is arranged in the gap, which counteracts the escape of lubricant from the gap 110 towards the first end 111.

The actuator 30a engages up to an engagement length L, here approx. L=5.0 mm, in the hollow cylinder section 105. It is the axial length of the threaded section of the bushing 120 essentially equal to the engagement length L. It is the length of the bushing in the axial direction approximately equal to the engagement length L.

The actuator 30a extends in the axial direction R at a passage 107 through the gearbox housing 52a and also through an outer housing of the power tool 14a. In this case, the sealing element 72a, in particular an O-ring element, is provided, which seals the passage 107 in order to prevent lubricant from escaping, in particular there. Between a front side 105a of the hollow cylinder section 105 and a gearbox housing wall 52a', in particular a cover element 109 is provided which supports the hollow cylinder section 105 in the axial direction in relation to the gearbox housing 52a. The cover element 109 presses the seal 72a against the gearbox housing 52a or a wall section 52a' surrounding the passage.

The hollow spindle 12a is mounted by means of a first bearing, a needle bearing 116, on the gearbox housing 52a, and by means of a second bearing, here a ball bearing 117, on a bearing plate element or a mounting flange 92 of the bearing plate element. The output shaft 12a extends through the bearing plate element and the mounting flange 92. The gearbox housing interior 108 is sealed by the second bearing 117 and partially sealed by the first bearing 116.

The shaft seal 100 is a threaded shaft seal 100 that is provided on a bushing 120. The thread is screwed into the inner wall 122 of the bushing 120 as internal thread 123. It is used to return the lubricant from the gap 110 towards the interior of the gearbox housing 108. The gap 110, i.e., the gap remaining between the bushing 120 and the actuating element 30*a*, is lubricated by the lubricating grease entering the gap from the interior of the gearbox housing 108. The return prevents the undesirable leakage of lubricating grease; the lubricating grease is forced back by the rotation of the spindle on the outer wall of the actuating element 30*a* towards the end face 105*a* and into the gearbox housing interior 108.

At its first end 111, a sealing element may be provided on or in the hollow cylinder section 105, in particular a sealing cap running around the actuator 30*a* and/or the decoupling element 28*a*, which prevents dust from entering the first end 111 of the gap 110.

The bushing 120 is pressed into the hollow cylinder section 105 so that it is rotationally resistant and, in particular, axially immovably connected to the hollow spindle 12*a*.

The bushing 120 has an outer flange 121 adjacent to the second end of the output spindle 12*a* in the area of the hollow cylinder section 105 or its end face 105*a*. This simplifies the installation of the bushing in the hollow spindle and achieves a tight fit.

Figure 3B:
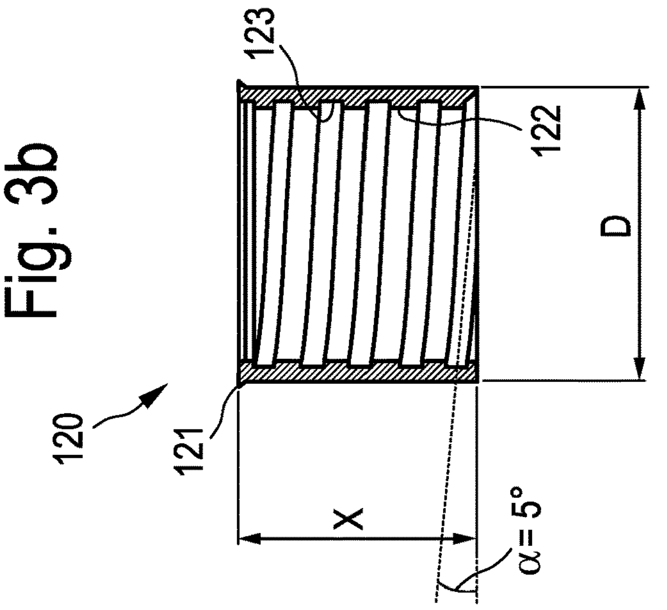
FIG. 3*b* is a cross-sectional view of the bushing with threaded shaft seal used in the example of FIG. 2.
Figure 3A:
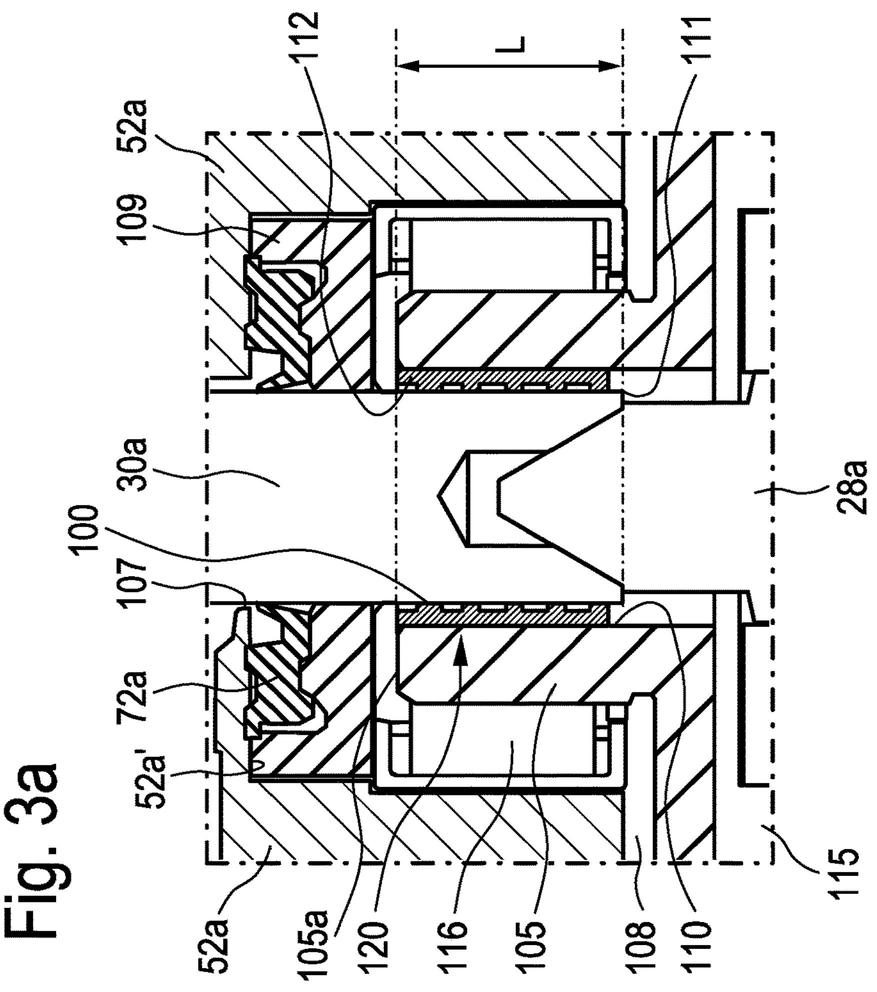
FIG. 3*a* is a detail of the cross-sectional view from FIG. 2

The bushing 120 has a length X=5.0 mm in the axial direction, a diameter of D=6.0 mm, and a wall thickness of about 0.4 mm, as shown in FIG. 3*b*. The bushing in this case is made of bronze.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A power tool comprising:

a drive motor mounted in a housing to drive a drive shaft;

a gearbox housing to accommodate a gearbox unit or an angular gearbox to convert rotation of the drive shaft into a rotation of an output shaft about a rotation axis of a transmission, wherein a lubricant for gearbox lubrication is adapted to be absorbed in a gearbox housing interior of the gearbox housing, the output shaft having a first end at which an insert tool unit is adapted to be mounted and having a second end, the output shaft being a hollow spindle with a cavity, which has a hollow cylinder section at the second end;

an actuator arranged rotationally resistant to the gearbox housing, the actuator engaging in the hollow cylinder section;

a gap formed coaxially between an inner wall of the hollow cylinder section and an outer wall of the actuator, the gap extending along the axis of rotation defining a continuous fluid-communication path between the cavity and the gearbox housing interior, the gap being connected at a first end to the cavity and at a second end to the gearbox housing interior thereby the lubricant from the gearbox housing interior is conveyed through the gap to lubricate the actuator and returned toward the gearbox housing during rotation; and a shaft seal arranged in the gap to prevent lubricant from escaping from the gap towards the first end of the output shaft.

2. The power tool according to claim 1, wherein the shaft seal is a threaded shaft seal which is configured to return the lubricant from the gap towards the gearbox housing.

3. The power tool according to claim 2, wherein a bushing is arranged in the hollow cylinder section, which is pressed into the hollow cylinder section, on whose cylindrical inner wall an internal thread is formed, which forms the threaded shaft seal.

4. The power tool according to claim 3, wherein the bushing has an outer flange at the end face of the hollow cylinder section, adjacent to the second end of the output shaft.

5. The power tool according to claim 3, wherein the bushing has a wall thickness between 0.2 mm and 0.8 mm or between 0.3 mm and 0.5 mm.

6. The power tool according to claim 2, wherein an internal thread is formed on a cylindrical inner wall of the hollow cylinder section, which forms the threaded shaft seal.

7. The power tool according to claim 2, wherein an external thread is formed on a cylindrical outer wall of the actuator and forms the threaded shaft seal.

8. The power tool according to claim 1, wherein a quick release device is configured for tool-free fixation of the insert tool unit to the output shaft.

9. The power tool according to claim 1, wherein the actuator is an actuator of a quick release device.

10. The power tool according to claim 8, wherein the quick release device has at least one clamping unit which, for the tool-free fixation of the insert tool unit to the output shaft, has at least one movably mounted clamping element to exert a clamping force on the insert tool unit in a clamping position of the clamping element, and has at least one operating unit to carry out a movement of the clamping element into the clamping position and/or into a release position of the clamping element, in which the insert tool unit is adapted to be removed from the clamping unit.

11. The power tool according to claim 10, wherein the quick release device has at least one decoupling unit that is provided to decouple the operating unit from the clamping unit as a function of the speed of the output shaft.

12. The power tool according to claim 1, wherein the power tool is an angle grinder.

13. The power tool according to claim 1, wherein the power tool is a hand-held power tool.

14. The power tool according to claim 1, wherein the gap is configured to be lubricated by a lubricating grease entering the gap from an interior of the gearbox housing.

* * * * *